United States Patent [19]

Lee

[11] 4,064,024

[45] Dec. 20, 1977

[54] METHOD FOR RADIATION PRODUCTION OF FUELS

[75] Inventor: Rupert Archibald Lee, Ann Arbor, Mich.

[73] Assignee: Texas Gas Transmission Corporation, Owensboro, Ky.

[21] Appl. No.: 691,767

[22] Filed: June 1, 1976

[51] Int. Cl.² .................................................. B01J 1/10
[52] U.S. Cl. .................................. 204/157.1 R; 176/9; 176/39
[58] Field of Search ................. 204/157.1 H, 158 HE; 423/415; 252/439; 176/39, 1, 9; 174/17 R, 17 GF; 250/501

[56] References Cited

U.S. PATENT DOCUMENTS

| 3,228,850 | 1/1966 | Fellows ........................ 204/158 HE |
| 3,390,091 | 6/1968 | Eibeck ............................... 174/17 R |
| 3,508,058 | 4/1970 | Frentrop .............................. 250/501 |
| 3,802,993 | 4/1974 | von Fredersdorff et al. ......... 176/39 |

FOREIGN PATENT DOCUMENTS

| 1,931,961 | 3/1970 | Germany ....................... 204/158 HE |
| 2,449,230 | 5/1975 | Germany ....................... 204/158 HE |

OTHER PUBLICATIONS

AD75106, $CO_2$ Laser Radiation Absorption in $SF_6$–Air Boundary Layers, Anderson et al. (8/72), p. i.
ERDA-28, (1/31/75), pp. 1-3, 8-10.
MATT-1050, (8/74), pp. 526-542.
NSE NAO 58, (2), pp. 107-108, 116-118.

*Primary Examiner*—Samuel W. Engle
*Assistant Examiner*—S. A. Cangialosi
*Attorney, Agent, or Firm*—Laurence R. Brown

[57] ABSTRACT

The invention disclosed provides a new improved chemical method for combustible fuel production by radiolysis of carbon dioxide in the presence of sulfur hexafluoride and $NO_2$. The dissociated products of carbon monoxide and oxygen may be recovered and used to produce hydrogen gas which can be converted to combustible fuels e.g. methane and methanol.

7 Claims, No Drawings

METHOD FOR RADIATION PRODUCTION OF FUELS

BACKGROUND

This invention relates to a new impoved method of combustible fuel production. More particularly, the present invention provides an efficient means for the production of CO by a combined chemical and radiation process of carbon dioxide in the presence of sulfur hexafluoride following which the CO may be processed to form other fuels.

A number of proposals have been made for using carbon dioxide to produce combustible fuels. Typically, these proposals have been commercially unattractive when the carbon dioxide is expendable, such as when carbon monoxide becomes part of the combustible fuel, because a source of carbon dioxide is necessary and some processes require inefficient amounts of energy. A further source of inefficiency is encountered when carbonates are used as a source of carbon dioxide, since chemical impurities are present and carbonates must ordinarily be ground and even then fail to be fine enough to produce large surface areas for reacting with other chemicals in an efficient process.

Much work is presently being done on the achievement of ignition and burn of fusion fuel such as, for example, deuterium-tritium in pellet form. While there are a number of different approaches to this problem, one approach includes the utilization of a source of energy from a laser and particular pellet configurations which will make it possible to achieve ignition and burn in a reaction chamber. Patents which illustrate generally the apparatus which can be used in this type of system are U.S. Pat. Nos. Whittlesey, 3,378,446, Daiber, 3,489,645, and Hedstrom, 3,762,992.

Pulsed lasers capable of delivering kilojoules of energy in fractions of a nanosecond to small pellets of thermonuclear fuel have been demonstrated to provide a practical means for achieving release of thermonuclear energy in useful quantity. In fusion laser systems, a laser pulse originates in an oscillator and is then shaped by a pulse stacker. The pulse stacker acts upon a single selected laser pulse from the oscillator by means of reflections and optical delays to generate a shaped pulse comprising a train of individual pulses properly attenuated to obtain the desired shape. After the laser pulse is formed, it is amplified by a series of conventional Nd:glass amplifiers.

The target system involves compression of a target to generate neutrons inside a target chamber which contains target-illumination optics. A standard target chamber has a stainless steel cylinder equipped with a vacuum system capable of achieving, for example, $10^{-6}$ Torr vacuum.

Two equal beams from the output amplifiers of the laser are directed into two opposite entry ports of the chamber via optics which include provisions for adjusting the time delay along each path. The target illumination system delivers nearly uniform laser energy to the targets over spherical target surfaces, using aspheric lenses and two ellipsoidal mirrors arranged such that the target is at the common focus of the two mirrors. Upon striking of the target by the laser, a controlled nuclear fusion reaction results.

Laser-driven compression of spherical targets has been shown to offer a practical commerical way to control nuclear fusion. One such disclosure is that published in "Plasma Physics and Controlled Nuclear Fusion Research", 1974, Vol. II, International Atomic Energy Agency, Vienna, and entitled "Experimental Study of Laser-Driven Compression of Spherical Glass Shells" by Charatis et al.

Significant neutron yields from such techniques have been reported by both KMS Fusion and Lawrence Livermore Laboratory in such publications as *Vacuum Technology*, May, 1975.

A target molecule for a chemical process may be exposed directly to radiation preferably from a fusion source. Efficient radiation dissociation is thus caused by high density neutron, alpha or X-radiation. However, radiation may be derived from neutron generators, fission reactions or other radiation sources available in the art. The use of radiation from thermonuclear fusion reactions has a significant advantage over the use of radiation from fission in such processes since the target molecules are less contaminated radioactively than in the presence of fission fragment radiation and fusion provides a more efficient source of neutron radiation that penetrates the reaction chamber walls and therefore a radiolytic chemical process may be used in isolation from the nuclear reaction process.

When the fission process is used as the radiation source, materials must be exposed directly to the fission fragments in order to obtain effective energy transfer and this also requires that the material be exposed to uranium or plutonium fuel directly. In some instances, the use of uranium dust to be mixed with the reactants is recommended. (See Advances in Nuclear Science & Technology, Vol. 1, Edited by Henley and Kouts, Academic Press, 1962, P. 298.) The result is a rather severe contamination of the products by radioactive fission fragments and by the fuel particles themselves. Direct exposure is necessary since about 80 per cent of the fission energy is contained in the fission fragments.

In thermonuclear fusion of D-T, 80 per cent of the energy is released as fast neutrons and the remaining 20 per cent of the energy is released as alpha and X rays. In the fusion reaction, the material to be processed may be exposed directly to the radiation or may be exposed while being confined in a separate container. The latter condition is particularly appropriate for the neutron exposure since the neutrons have an effective penetration characteristic.

Thus, the use of fusion devices, with the resulting high energy neutrons, as well as alpha and X rays, allows for the direct interaction of the radiation with the reactants while limiting radioactivity problems to those caused by neutron activation. This difference alone is extremely significant in considering the use of thermonuclear reactors for chemonuclear processing.

OBJECTS AND BRIEF DESCRIPTION

It is one object of this invention to process carbon dioxide in a chemical-radiation process in the presence of sulfur hexafluoride and $NO_2$ at 500° F.

It is another object of this invention to produce combustible fuels from non-fossil sources.

It is a more specific object of this invention to provide a chemical cycle in which carbon dioxide may be processed and regenerated for reprocessing.

It has now been found, that by practice of the present invention, there results a new improved method for combustible fuel production by radiation of carbon dioxide in the presence of sulfur hexafluoride and $NO_2$ at an elevated temperature. The recovered carbon monoxide is processed with water to form carbon dioxide and hydrogen. The hydrogen is used to form combustible fuels such as methane and methanol. Thus, commercially attractive methods are made available to the art for processing carbon dioxide so as to derive combustible fuels, and oxygen as a by-product.

DETAILED DESCRIPTION

Generally, the present method of processing carbon dioxide is based on the following chemical reaction sequence:

$$2CO_2 \xrightarrow[NO_2, SF_6, 500° F]{radiation} 2CO + O_2 \quad (I)$$

$$CO + H_2O \rightarrow CO_2 + H_2 \quad (II)$$

Molecular fragmentation by radiation or "radiolysis" is a known phenomenon. It can be used to form desirable or useful molecular species from feed materials containing larger molecules.

Examples of radiolysis are the formation of hydrogen and oxygen by radiolytic decomposition of water and also the formation of carbon monoxide and oxygen by radiolytic decomposition of carbon dioxide. However, the yield or "G" value for the radiolytic reaction may be too low to be useful or economical. A commonly quoted G value for the yield of hydrogen molecules for radiation of pure liquid water by gamma rays is 0.5. (The G value is the number of product molecules formed per hundred electron volts of energy absorbed.) The present invention involves the combination of processing steps of chemical reactions and radiolytic processes. Depending on the particular material used, the chemical reaction may originate the process followed by a radiolytic step, or an initial radiolytic step may produce molecules suitable for a chemical reaction to produce the final desired product. The process is so arranged that, except for secondary losses by escape, evaporation, mutation and so forth, all the chemicals, except the original feed material, may be completely recycled. The original feed material is selected to provide the final desired product as is the case in the one-step radiolytic process mentioned earlier. In the present process of combining chemical and radiolytic steps, the feed products and the yield products may be the same as in the one-step process. One important objective of the combined steps is to utilize the radiolytic step for exposure of a molecule which is specifically designed to have a high G value. Accordingly, when the chemical reaction is to be followed by the radiolytic process, the chemical reaction is used to create from a combination of the feed material and a chemically recyclable molecule a new radiosensitive molecule and a by-product. After radiolysis of the newly-created radiosensitive molecule, one fragment is collected as a desired product and the second fragment is reacted with the by-product to recreate both the original recyclable molecule and to provide the second desired product.

In all the foregoing sequences, it is important that the radiolysis of the starting target molecule such as carbon dioxide be effected in the presence of sulfur hexafluoride ($SF_6$). The presence of sulfur hexafluoride has been found to increase the G value over that when carbon dioxide is separately exposed to radiolysis at elevated temperatures.

Amounts of sulfur hexafluoride used in the present radiolysis vary depending upon reaction conditions. Amounts greater than about 10% by weight based on the total weight of carbon dioxide do not appear to have significant influence on the radiolysis. Typically, the amount of sulfur hexafluoride varies from about 0.5% by weight to about 5% by weight with about 2% by weight being sufficient.

Thus, the present process starts with a suitable radiation sensitive molecule $CO_2$ which is processed in the presence of sulfur hexafluoride. The products of the radiolysis are then used in a chemical reaction. Carbon dioxide becomes dissociated to carbon monoxide and oxygen with the carbon monoxide being reacted with water to form carbon dioxide and hydrogen. The hydrogen and oxygen may be separately processed for fuel generation.

EXAMPLE 1

In this procedure, 99% by weight $CO_2$ and 1% $NO_2$ was radiated with gamma-rays at 500° F. Using the same procedure and radiation, and the addition of 1% by weight $SF_6$, an increase of CO yield of 30.0% was noted.

The major objective of the combined process is to have radiolysis occur in a selected radiation sensitive molecule with a high G value with $SF_6$ present.

It should be noted, however, that the fraction of the input radiation energy which is not utilized directly for radiolysis will be absorbed and converted to heat. The system can therefore be designed so that the driving high energy radiation and heat are both supplied from one and the same source, i.e., fast neutrons and other radiations from a thermonuclear reaction.

What is claimed is:

1. A method for producing carbon monoxide which comprises, radiating $CO_2$ in the presence of sulfur hexafluoride with radiation in the class including gamma rays and neutrons causing the $CO_2$ to disassociate into CO and $O_2$.

2. The method of claim 1 wherein the sulfur hexafluoride is present in an amount up to about 10% by weight of the carbon dioxide feed.

3. The method of claim 2 wherein the sulfur hexafluoride is present in an amount of about 0.5% by weight to about 5% by weight.

4. The method of claim 2 wherein carbon monoxide generated by radiation of carbon dioxide is reacted with water to form carbon dioxide and hydrogen.

5. The method of producing gaseous fuel from $CO_2$ and water comprising the steps of:
   A. subjecting $CO_2$ in the presence of $SF_6$ and $No_2$ at 500° F. to neutron or gamma radiation disassociating $CO_2$ into CO and $O_2$;
   B. reforming generated CO in Step (A) by reaction with water to $H_2$ and $CO_2$ for recycling;
   C. and separating the $H_2$ and $O_2$ from said process as product gases.

6. The method of claim 5 wherein the amount of $SF_6$ is up to about 10% by weight of the feed $CO_2$.

7. The method of claim 5 wherein the radiation comprises neutron radiation.

* * * * *